United States Patent
Skoog (10) Patent No.: US 6,977,924 B1
(45) Date of Patent: Dec. 20, 2005

(54) CONTROL AND DISTRIBUTION PROTOCOL FOR A PORTABLE ROUTER FRAMEWORK

(75) Inventor: Frederick H. Skoog, Colleyville, TX (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/469,670

(22) Filed: Dec. 22, 1999

(51) Int. Cl.$^7$ .............................................. H04L 12/56
(52) U.S. Cl. ..................... 370/359; 370/419; 709/203; 709/250; 709/321; 709/328
(58) Field of Search ............................. 370/395.41, 419, 370/463, 493, 397, 352, 400, 401, 238, 359, 551, 389, 392, 396, 398, 395.31, 395.5, 395.52, 422, 464–469; 709/250, 203, 201, 321, 328

(56) References Cited

U.S. PATENT DOCUMENTS

| | | | |
|---|---|---|---|
| 5,434,863 A | * 7/1995 | Onishi et al. | 370/402 |
| 5,517,662 A | * 5/1996 | Coleman et al. | 709/201 |
| 5,619,650 A | * 4/1997 | Bach et al. | 370/469 |
| 5,802,278 A | 9/1998 | Isfeld et al. | |
| 5,913,028 A | * 6/1999 | Wang et al. | 709/203 |
| 6,081,846 A | * 6/2000 | Hyder et al. | 709/250 |
| 6,157,955 A | * 12/2000 | Narad et al. | 709/228 |
| 6,728,748 B1 | * 4/2004 | Mangipudi et al. | 718/105 |
| 6,765,931 B1 | * 7/2004 | Rabenko et al. | 370/493 |

FOREIGN PATENT DOCUMENTS

WO WO 00/30294 A2 5/2000

OTHER PUBLICATIONS

Article: IP Multicasting Shortcut Over ATM. A Winner Combination by Dumortier et al., IEEE 1998.*

* cited by examiner

*Primary Examiner*—John Pezzlo
(74) *Attorney, Agent, or Firm*—Locke, Liddell & Sapp (57) ABSTRACT

A control and distribution protocol (CDP) is implemented for transport across a backplane bus, through a high-speed serial link or through a switching fabric connection. The protocol includes an intra-system transport of dynamic routing protocol (DRP) IP messages, the distribution of routing information within the router, the transport of control and maintenance messages, and the transport of IP and multi-protocol label switching (MPLS) traffic between ingress and egress ports. The protocol further includes a dynamic routing and control driver which interacts with dynamic routing control applications to exchange messages that are to be transmitted to packet flow processors and to handoff messages received from packet flow processors. A packet flow processor driver which services messages carried between the dynamic routing control and packet flow processors. An IP traffic interface provides transfer of IP L3/L2 protocol data unit (PDU) header primitive from the packet flow processors. Both the DRC driver and PFP driver include a framework transport interface.

9 Claims, 6 Drawing Sheets

CONTROL AND DISTRIBUTION PROTOCOL FOR A PORTABLE ROUTER FRAMEWORK

TECHNICAL FIELD OF THE INVENTION

The present invention relates to a control and distribution protocol (CDP), and more particularly to a protocol for providing internet protocol routing functions to a host system such as, for example, a telecommunication switching or transmission system.

BACKGROUND OF THE INVENTION

When building internet protocol (IP) router capabilities with centralized dynamic route determination and distributed high performance IP packet processing capability, that are portable to many different host system architectures, it is necessary to have an efficient internal protocol for the transportation of control, maintenance, performance information, dynamic routing protocol message distribution messages, and routing table distribution management messages. Existing implementations of IP routers are system specific, and do not lend themselves to being portable to multiple operating environments.

A need exists for a protocol for use with existing and new communication system architectures to provide high performance internal communications capability for adding IP network routing functions to a host system such as, for example, an IP router, a telecommunication switching system, or a telecommunication transmission system. Such a protocol assumes the addition of an IP network route processing functioning component and multiple distributed IP packet flow processing functional components.

SUMMARY OF THE INVENTION

The present invention provides for a control and distribution protocol (CDP) which is implemented for transport across a backplane bus, through a high-speed serial link or through a switching fabric connection. The protocol includes an intra-system transport of dynamic routing protocol (DRP) IP messages, the distribution of routing information within the router, the transport of control and maintenance messages, and the transport of IP and multi-protocol label switching (MPLS) traffic between ingress and egress ports. The protocol further includes a dynamic routing and control driver which interacts with dynamic routing control applications to exchange messages that are to be transmitted to packet flow processors and to handoff messages received from packet flow processors. A packet flow processor driver is provided which services messages carried between the dynamic routing control and packet flow processors. An IP traffic interface provides transfer of IP L3/L2 protocol data unit (PDU) header primitive from the packet flow processors. Both the DRC driver and PFP driver include a framework transport interface.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

The present Control and Distribution Protocol (CDP) is an element of a Portable/Router Framework (PRF), and is a lightweight, connection oriented, datagram protocol that supports communications among multiple Portable Router Framework components. The CDP meets performance requirements of small to large router implementations and provides flexibility and expandability for new services and functions. The present protocol is lightweight enough so as not to degrade performance under very demanding service requirements, yet be robust enough to provide a high level of reliability.

The present Portable Router Framework (PRF) identifies several areas of functionality that communicate with each other to perform their functions. The CDP facilitates this communication and defines specific messages and procedures relative to layer 3 and layer 2 functionality. It is assumed that lower layer physical interconnection capabilities and formatting will be defined by the target, or host, a system design. Therefore, the CDP is defined such that a number of different system architectures can use the protocol with minimal changes. CDP can be implemented for transport across a backplane bus, through a high-speed serial link or through a switching fabric connection. The two primary communication points are the Dynamic Routing and Control (DRC) and the Packet Flow Processors (PFP). CDP is primarily concerned with communications within the PRF, but CDP relies on host system maintenance, administrative and configuration capabilities to perform its work.

Figure 1:
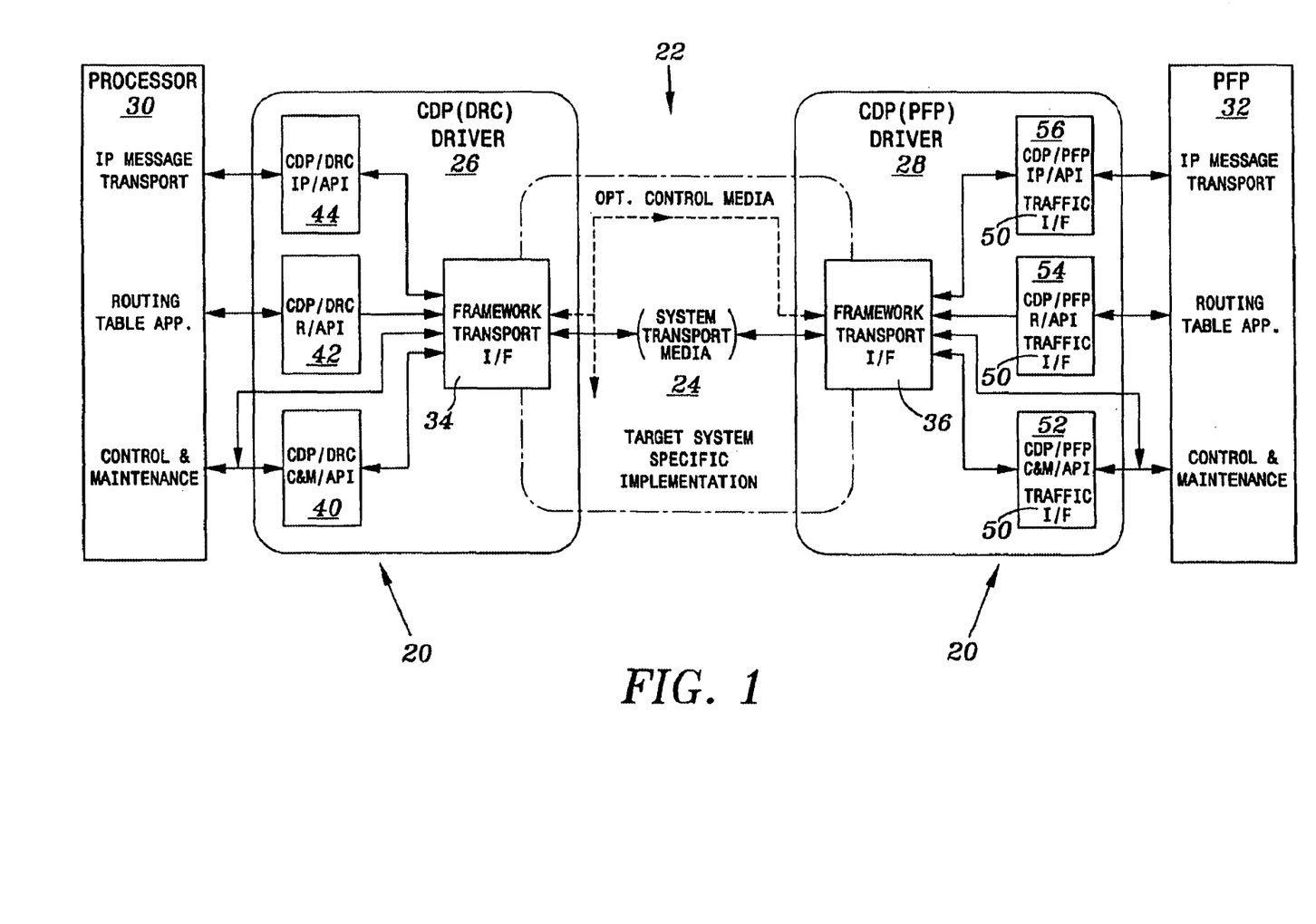
FIG. 1 is a block diagram of the present Control and Distribution Protocol.

FIG. 1 illustrates the major components of CDP, generally identified by the numeral 20 and the main interconnections of CDP 20 with other functionality within a Portable Router Framework, generally identified by the numeral 22. The CDP 20 provides services for four major router functions: (1) the intra-system transport of Dynamic Routing Protocol Internet Protocol (DRP IP) messages, (2) the distribution of routing information within the router, (3) the transport of control and maintenance messages, and (4) the transport of IP and Multi Protocol Label Switching (MPLS) traffic between ingress and egress ports via a System Transport Media, generally identified by the numeral 24. CDP Drivers 26 and 28 are either associated with the Dynamic Routing & Control (DRC) element main processor 30 or the Packet Flow Processor (PFP) elements 32. DRC elements 30 include, for example, routing software of a main processor. PFP elements 32 include, for example, telecommunication line cards, or interfaces to ethernet, and any data communication link for carrying IP traffic. In most systems there will be one online DRC driver 26. Depending on the system requirements, there may be a second DRP driver 26 utilized as a standby element that would assume control in the case the online unit experiences a failure. Other host systems may utilize multiple DRCs in a multiple virtual router arrangement. In all cases, an administrative process or other process specifies the relationship between DRCs and associated PFPs 32. There may be less PFPs 32 associated with each DRC 26 depending on the size and the partitioning of the host system. In all cases the PFPs 32 will communicate back to only one DRC driver 26. For Forwarded IP and MPLS traffic, each PFP 32 is required to communicate to all other associated PFPs 32.

The CDP (DRC) Driver 26 provides message transport services for applications executed by the DRC driver 26. CDP 20 is utilized by the DRC driver 26 to communicate with all of its associated PFPs 32. The Driver 26 has two main functions. The first is to interact with the DRC applications to exchange messages that need to be transmitted to PFPs 32 and to handoff messages received from PFPs 32. The second is to translate message format and routing information between the CDP protocol and the host system's transport media 24 protocol which in most cases is proprietary to the host systems architecture.

The CDP/DRC driver 26 upon initialization and receiving configuration (including system topology) information from the host system's administrative function establishes a link layer connection with all of its associated PFP 32 elements. To accomplish this connection, the driver 26 maintains an inter-system routing table that specifies link addresses of all active PFPs 32 and runs a CDP proprietary link layer protocol that drives the CDP link state machine. Link state status information is maintained for each DRC to PFP association. This link layer connection provides reliable transport services for messaging between the CDR/DRC Application Programming Interface (API) and the CDP/PFP APIs. Below the CDP link layer is an interface to the host systems transport protocols and transport media 24. This interface 34,36 provides a portion of the required Portable Router Framework Host System Porting Specification.

Above the CDP Link Layer are the CDP message APIs. The APIs can work in either a push or a poll-and-pull mode for message transfer requests depending of the host systems needs. This mode is a configurable item. When a message is ready for transport, the CDP interrogates the information received from the application to determine how the message will be routed and if multicast is requested. Each API to the DRC code is assigned a message type indicator that is carried across the link in each datagram. The receiving side uses the message type indicator to deliver the message to the designated application. Each message may be addressed to a port, a PFP application or an IP address. The CDP translates these addresses to determine the host system address of the associated PFP. The CDP then formats the message and places it in the appropriate link layer queue for a specific PFP.

The CDP/DRC API is composed of three APIs 40, 42, and 44 to support the three types of messaging provided by the CDP. The three message types are Control and Network Management messages, routing table management messages, and IP formatted messages.

Figure 2:
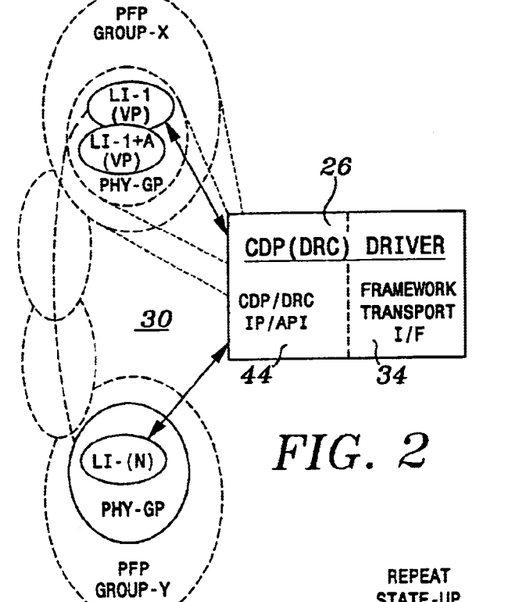
FIG. 2 is a block diagram of the present Dynamic Routing and Control Driver illustrating driver functions.

Control and Network Management API 40 allows the DRC control function to perform the following functions;
  Initialization
  Configuration
  System Status monitoring
  Synchronization
  Fault reporting and recovery
  Performance Monitoring and reporting
  API 40 primitive contains the following information.
  Send messages to a PFP or a PFP group
    Destination PFP ID or PFP Group ID
    Message Type
    Function or Action Opcode
    Arguments
  Receive C&M message from PFP
    Source PFP ID
    C/M Indicator
    Event
    Arguments The Routing Table Application API 42 allows the DRC to Initialize and maintain routing table information held in all PFPs 32. API 42 also provides for the monitoring and verification of the distributed routing table contents. Table status and fault events received from the PFPs are signaled up to the DRC routing distribution application. The R-API 42 primitive contains the following information.
  Send routing table initialization and route update
    Transaction ID
    PFP ID or PFP Group D
    Partition ID
    Information Pointer
    Information Size
    Information Check-sum
  Receive PFP Routing Table Event
    Destination DRC application ID
    Source PFP ID
    Event
    Arguments As shown in FIG. 2, DRP software sends and receives IP formatted messages through all external circuits that connect to other peer routers to gain knowledge of network topology. IP API 44 allows for the transport of these IP messages to and from the external interface circuits that are associated with PFPs that service IP network traffic. The DRC applications use a Logical Interface (LI) as a local representation of the actual physical port (and virtual connection (VC)) that may be associated with a remote router interface. It is the function of the CDP/DRC IP API 44 to prepare any IP message residing in any LI for transport to its associated outgoing router physical interface. This activity can be started by having the DRC software alert the CDP and push the message to the CDR/DRC IP API 44 or by having the CDP/DRC IP-API poll for any active LI and pull the message from the LI. The DRC and CDR will support both scenarios with the actual implementation dependent on the host system operating system capabilities. The CDP/DRC IP API 44 maintains association relationships for virtual connections assigned to ports and for ports assigned to PFPs. These associations can be used for multicast functions or for maintenance functions. The DP/DRC LI_API also maintains an association of the outgoing ports (w/VC) with their assigned IP address that is used as the Source Address within the outgoing IP packet.

Figure 3:
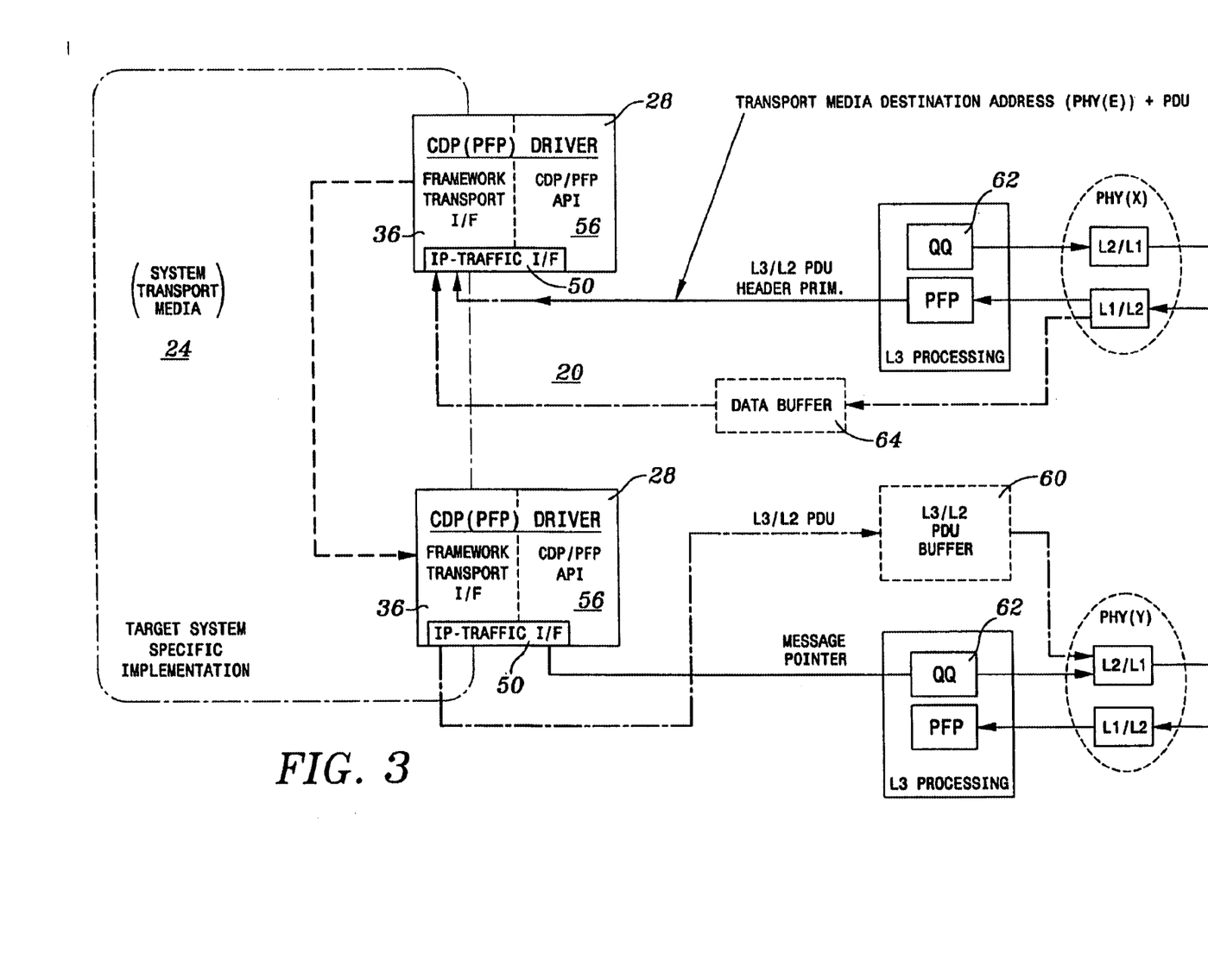
FIG. 3 is a block diagram of the present Packet Flow Processor Driver illustrating driver functions.

The CDP/DRC IP API 44 primitive information is as follows.
  Send IP message (DRC message push or CDP message pull)
    LI_ID; Logical Interface Identification
    IP message locator
      Message ID
      Index
  Receive IP Message from PFP
    Source PFP
    Source PHY/VC
    IP Packet or Packet pointer The CDP/PFP Driver 28 receives and transmits datagram messages from and to a host systems DRC function. Upon initialization and configuration the CDP/PFP Driver 28 establishes an link layer connection with its designated DRC. Following connection establishment the driver signals through its APIs that message services are available. The CDP/PFP Driver 28 has a one-to-one relationship with the designated DRC and provides services for the three types of messages carried between the DRC and the PFP. The CDP/PFP Driver has an additional requirement of facilitating transport through a traffic interface 50 of forwarded IP traffic from an ingress PFP (port) to an egress PFP (next-hop port) through the host systems transport media 24 as illustrated in FIG. 3.

The PFP Application API contains three message type APIs that correspond to the CDP/DRC APIs and interface to associated application functions in the PFP.

The Control and Management API 52 allows the control function in the DRC and PFP to communicate. API 52 interacts with the control element of the PFP 32 to deliver commands from the DRC. API 52 also accepts events generated within the PFP that need to be transported to the DRC for processing. The CDP/PFP C&M-API 52 primitive contains the following information.

PFP to DRC messages.
  DRC Source ID
  C/M Indicator
  Event#
  Arguments
DRC to PFP messages.
  Source DRC ID
  C/M Indicator
  Function Operator
  Arguments The Routing Table API 54 allows communication IP routing information from the DRC to the PFP for use in routing IP datagram traffic. Routing Table initialization and update messages are communicated from the DRC. Table status messages and performance messages are communicated back the DRC. The CDP/PFP R-API 54 primitive information is as follows.

DRC to PFP messages
  DRC Source ID
  Message Type
  Function Operator
  Arguments
PFP to DRC messages.
  DRC Destination ID
  Event #
  Arguments The IP messaging API 56 provides a path for locally addressed IP messages to reach the DRC applications. API 56 also provides for locally generated IP messages to be forwarded through I/O (Connections) ports assigned to a specific PFP. The CDP/PFP IP-API 56 primitive information is as follows.

PFP to DRC (router ingress) IP messages.
  Destination DRC ID
  IP Packet Locator (pointer)
  Source Connection/Port ID (PHY-VC)
DRC to PFP (router egress) IP messages.
  Source DRC ID
  Message Type
  Next-Hop (PHY-VC)
  L3/L2 Primitive information
  IP Message Locator (pointer)
  QQ# (Quality of Services Queuing Priority)

Referring to FIG. 3, the CDP IP Traffic Interface 50 provides for an efficient transfer of the IP L3/L2 PDU Header primitive from the PFP forwarding function to the CDP for the purpose of reconstruction of the modified IP packet header with the IP packet data. IF Traffic Interface 50 also provides for receiving forwarded L3/L2 PDUs from the Framework Transport Interface 36 and directing them to buffer memory 60 for output queuing. At this point a 'message pointer' is sent to the Quality of Service Queuing (QQ) 62 management function. The L3/L2 PDU is stored in buffer 64 supported by the host system.

Both the CDP/DRC Driver 26 and the CDP/PFP Driver 28 contain a similar functional block Framework Transport I/F 34 and 36. The Framework Transport Interface 34 and 36 perform several functions which are divided into two categories, Framework CDP functions and host system functions. For the Framework functions, the interface contains the CDP Link Layer protocol and performs a multiplexing/demultiplexing function for interacting with the CDP APIs. There is an intra-system address translation function to assist in intra-system routing of CDP datagrams. The host system functional group is system specific and is responsible for message integration, including formatting, addressing and protocol executions with the host systems transport media. Between the two functional groups is the CDP Interface that supports the Portable Router Framework portability.

The Framework Transport Interface 34 and 36 after initialization and configuration, establish a link layer connection between the system provisioned DRC and each provisioned PFP 32. With the links established the CDP APIs are notified that the link is available for message transport. The FT I/F 34 and 36 use the Message type indicator carried within the message header to deliver datagrams to the appropriate CDP API.

The CDP Link Layer protocol is responsible for establishing a communication link between the DRC and its associated PFP modules. When the Link Layer connection is established the CDP APIs are signaled that message services are available to the application layer functions.

Figure 4:
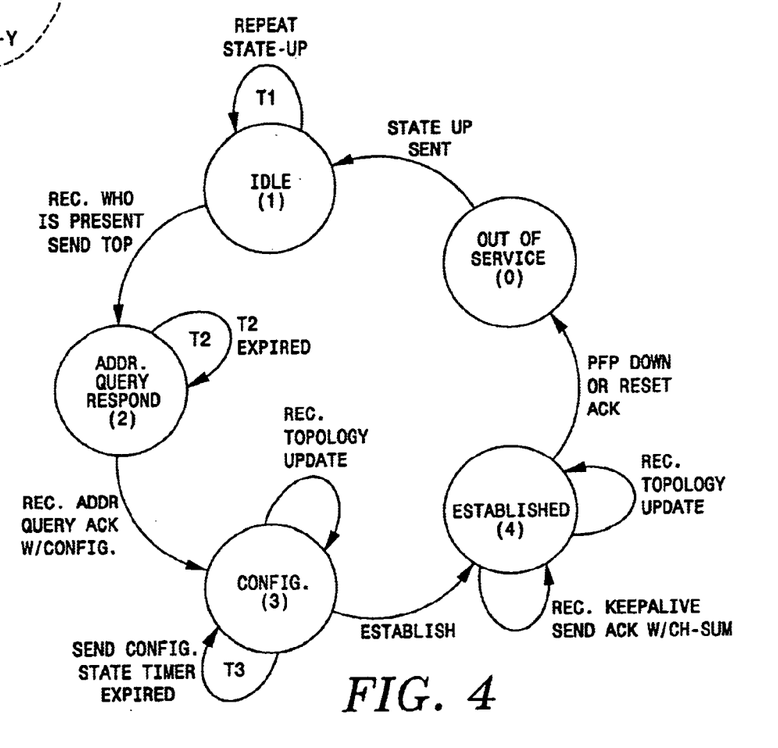
FIG. 4 is a block diagram illustrating data link layer state transactions.

The DRC is considered to be the controlling, or master, element. During the initialization phase both the DRC side and the PFP side of the link start timers. On the expiration of the timers, the protocol driver will issue either a command from the DRC or an event from the PFP to alert the other end that the a host system layer 1 connection has been made and therefor CDP can begin its establishment phase. If the messages are unsuccessful, the timers are restarted. This process will continue until the host system connection is set. The host system is responsible for establishing a system transport media connection to support CDP communications. Once the initial messages are received, The DRC side will ask the PFP for topology information. When this is received from the PFP side the DRC side will download configuration information. The PFP will stay in a configuration state until it is told to move to a link established state in coordination with other PFPs. While in the configuration state the PFP side will run a timer and on expiration of the timer will send a 'configuration state timer expired event'. In the link established state, CDP will accept application layer datagrams, events or commands, for transport across the link. Also during the link established state the DRC side will issue 'Keep-alive' commands which will be acknowledged by the PFP side. Along with the 'Keep-alive ACK' event from the PFP side will be PFP element status information which will include routing table status information which may identify the last update ID and current table check-sum. The DRC side can command the PFP side to reset in which case the PFP CDP link layer will stop service and move through the Out-Of-Service state and attempt to reestablish a connection or the DRC side can leave the PFP in an Out-of-Service condition.

FIG. 4 shows the CDP/PFP link layer state machine transitions. The timers associated with each state are set to default values on initialization but can be modified dynamically by the CDP/DRC Link Topology Information Update command messages.

Figure 5:
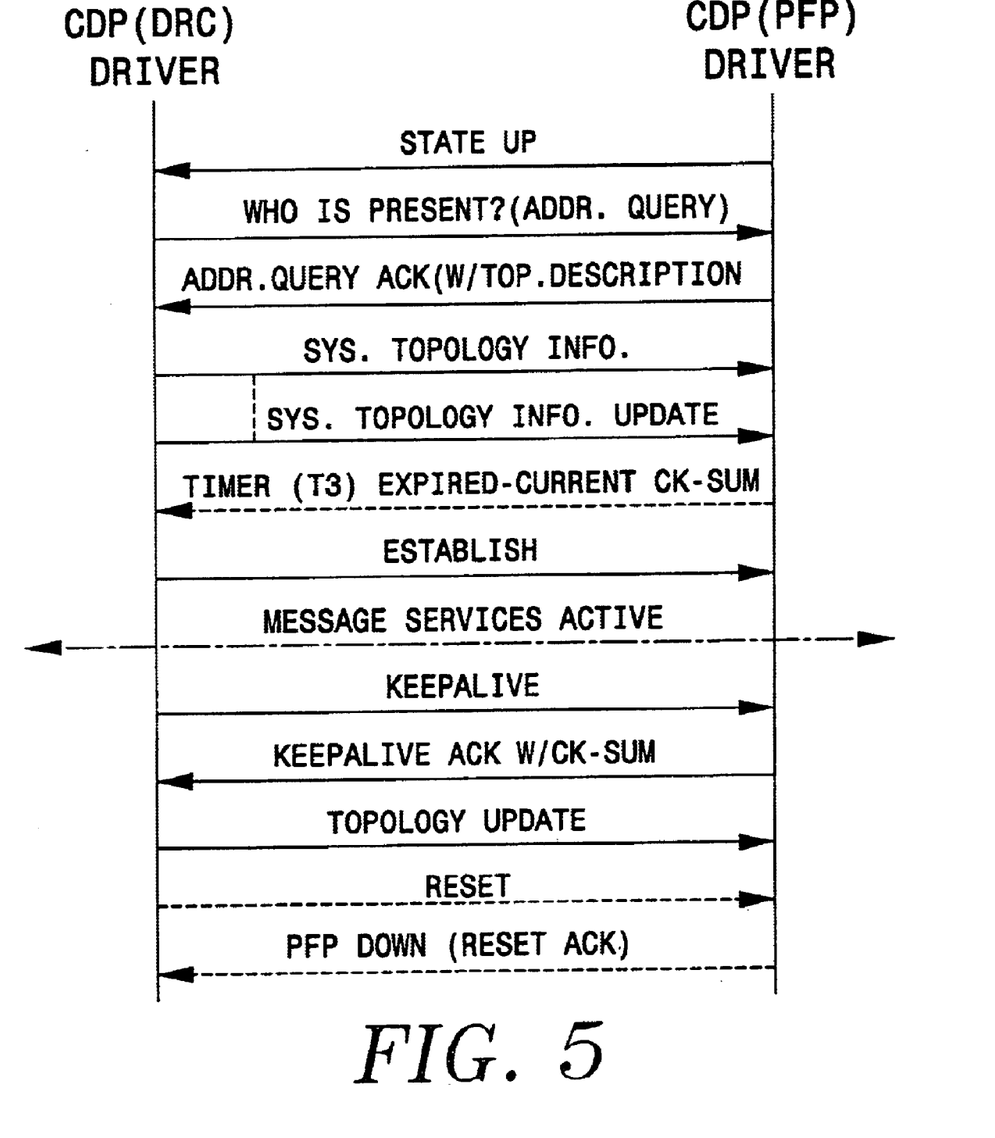
FIG. 5 is a diagram illustrating link layer messages between the Dynamic Routing and Control Driver and Packet Flow Processor Driver.

The CDP Link Layer message set is utilized to establish communications between the DRC and a PFP and is shown in FIG. 5.

CDP/DRC Link Commands
   Who is present? (Topology Query)
   System Topology Information Initialization
   System Topology Information Update
   Establish
   Keep-alive
   Reset
CDP/PFP Link Events
   State-Up
   Topology Query Response
   Timer (Tn) Expired
   Keep-alive ACK
   Reset ACK In order for the Framework Transport I/F 34 and 36 to accomplish their function, integration with the host system requires a definition of interworking procedures and exchange of configuration and addressing information. CDP requires the capability to establish communications with all associated system elements and therefor needs to maintain a table of addresses of each element that makes up the router function. This information needs to be supplied by the host system. The CDP design defines a specific interface for integration with the host system's message transport implementation. It is the responsibility of the host system to implement their side of the interface.

In order to establish communications between Portable Router Framework elements, CDP 20 defines the address model that is required. As part of the host system porting development, the host systems administrative and maintenance is required to interact with CDP to establish and maintain intra-system routing information. This routing requires a common understanding of naming and addressing of key router elements. In this regard the DRC and PFPs routing function are defined. Also, the host system's router ports and associated virtual connections are defined. For portability, the host System Fabric Interface Address (SFIA) which identifies the host systems address for the Framework element is used as the integration key. To facilitate CDP integration, the following associations are established:

Address Model;
   DRC(n)=SFIA
   DRC(n) Application=SFIA+Message Type
   PFP(n)=SFIA
   PFP(n) Partition=SFIA+Partition Number
   PFP(n) Application=SFIA+Message Type
   PHY(n)=SFIA+Card Port number
      (PHY system level=Cabinet+Shelf+Slot+Port#)
   Next Hop=PHY(n)+VC
   DRC_LI (from PFP)=DRC(n)+PHY(n)+VP#
   DRC_LI (from DRC)=IP Address
   DRC_LI (from C&M to CDP)=DRC(n)+PHY(n)+VP#

The message structures for carrying CDP protocol datagrams between the DRC and the PFPs is shown below:

IP Message Transport Message Structure (DRC to PFP)

[PFP ID#] + [DRC ID#] + [Message type] + [Next-Hop] + [IP Packet]
(16 Bits)   (8 Bits)   (3 Bits)   (m Bits)   (n Bytes)

Control & Maintenance Message Structure (DRC to PFP)

[PFP ID#] + [DRC ID#] + [Message type] + [C/M Indicator] + [Function] + [Arguments]
(16 Bits)   (8 Bits)   (8 Bits)   (1 Bits)   (15 Bits)   (n Bytes)

Routing Table App. Message Structure (DRC to PFP)

[PFP ID#] + [DRC ID#] + [Message type] + [Function] + [Arguments]
(16 Bits)   (8 Bits)   (8 Bits)   (8 Bits)   (n Bytes)

IP Message Transport Message Structure (PFP to DRC)

[DRC: ID#] + [Message type] + [Source PHY/VP] + [IP Packet]
(8 Bits)   (8 Bits)   (x Bits)   (n Bytes)

Control & Maintenance Message Structure (PFP to DRC)

[DRC ID#] + [Source PFP ID#] + [Message type] + [C/M Indicator] + [Event] +
(8 Bits)   (16 Bits)   (8 Bits)   (1 Bits)   (7 Bits)

[Arguments]
(n Bytes)

Routing Table App. Message Structure (PFP to DRC)

[DRC ID#] + [Source PFP ID#] + [Message type] + [Event] + [Arguments]
(8 Bits)   (16 Bits)   (8 Bits)   (7 Bits)   (n Bytes)

Figure 6:
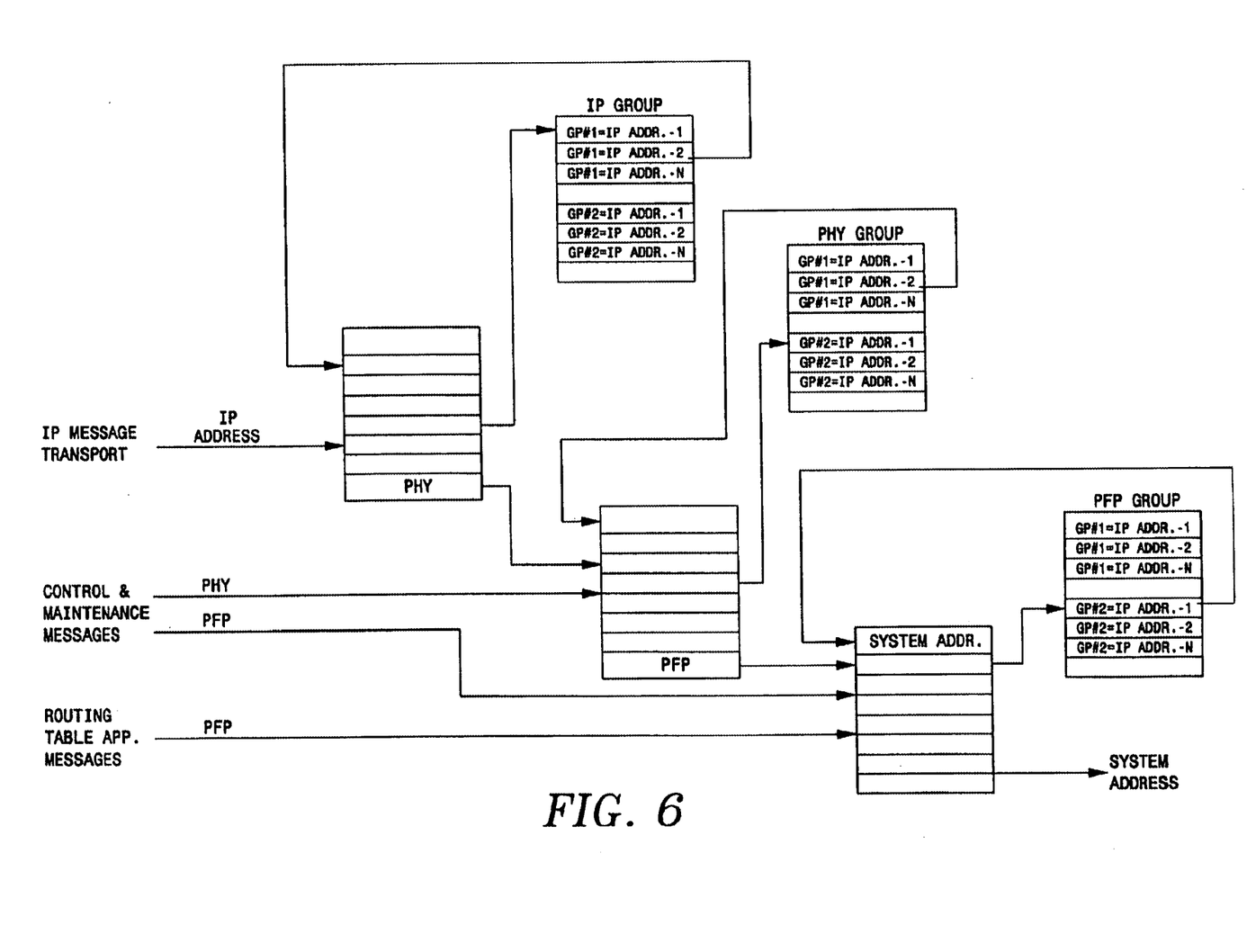
FIG. 6 is a table illustrating intra-system routing.

The following are the assigned CDP message Types;
   Message Type 00H—CDP Link State Message
   Message Type 01H—IP-API Message
   Message Type 02H—C&M-API Message
   Message Type 04H—R-API Message
CDP uses information within the API PDUs to determine the host system's SFIA for destination routing through the host systems transport media. DRC applications may have a need to multicast certain messages to multiple PFPs. Therefore, included are tables that allow multicasting to groups of IP addresses, groups of PFPs and groups of physical ports. Table identification required to perform the intra-system routing function is shown in FIG. 6.

Figure 7:
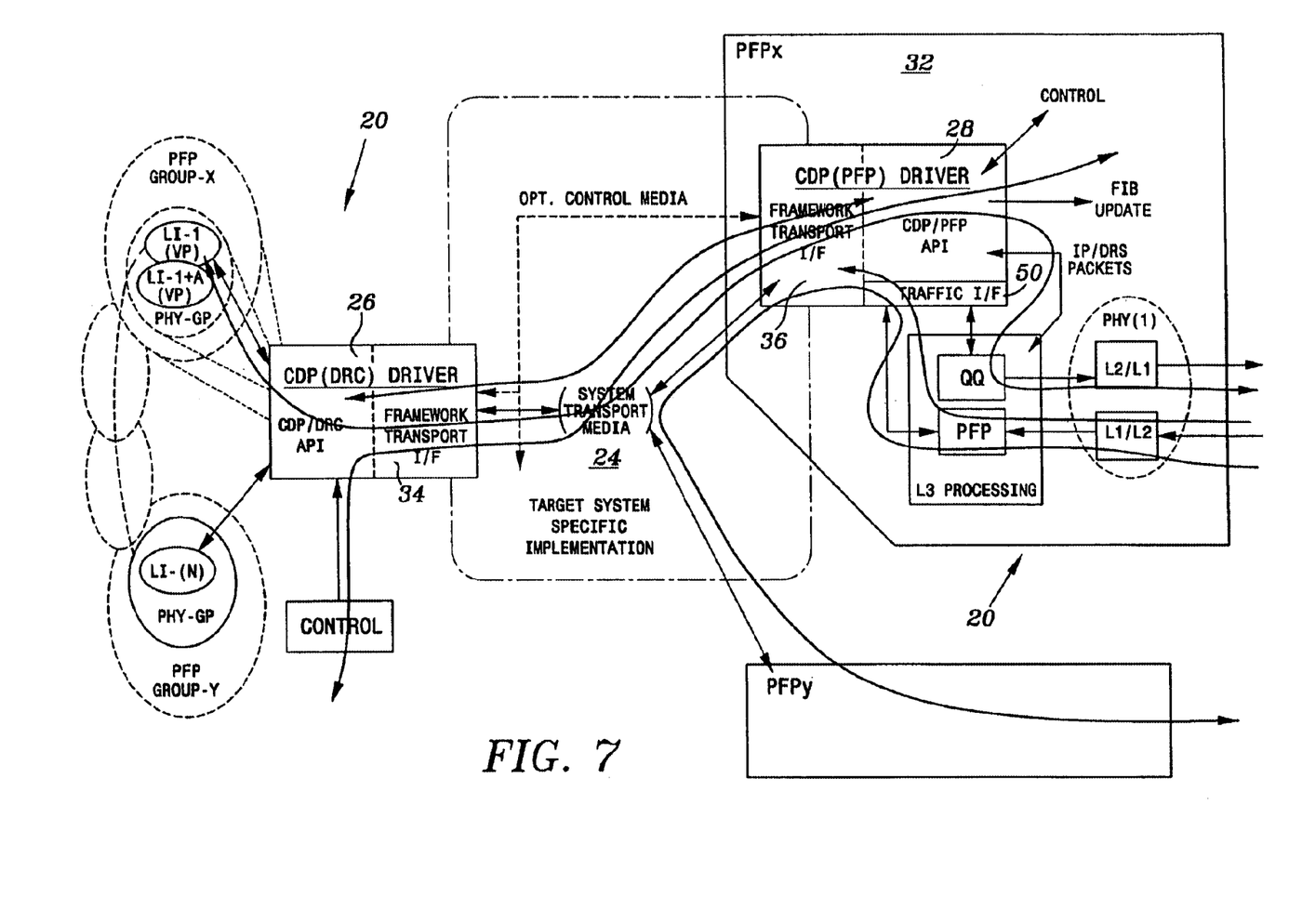
FIG. 7 is a block diagram illustrating message paths.

FIG. 7 illustrates message paths between Drivers 26 and 28 via the media 24.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A router for providing transportation of messages between a main Dynamic Routing and Control (DRC) processor and packet flow processors, the messages transported via a system transport media, the router comprising:
   a Dynamic Routing and Control (DRC) driver including a plurality of Application Program Interfaces (API) for interfacing to the main DRC processor;
   a transport interface for interfacing between said DRC driver APIs and the system transport media, wherein said DRC driver translates message format and routing information between a first protocol used by the main DRC processor and a second protocol used by the transport media;
   a Packet Flow Processor driver (PFP driver) including a plurality of Application Program Interfaces (API) for interfacing to the packet flow processors and designated DRC driver;
   a transport interface for interfacing between said PFP driver APIs and the transport media, wherein the transport interface routes messages from the transport media to the appropriate PFP driver API in response to a type of message; and
   said DRC driver and said PFP driver transport messages between the main DRC processor and the packet flow processors.

2. The router of claim 1 wherein said messages transported between the main processor and the packet flow processors include internet protocol, routing table distribution and control and maintenance messages.

3. The router of claim 1 wherein said PFP driver transports traffic messages between ingress and egress ports of one or more of the packet flow processors via the transport media.

4. The router of claim 3 wherein said traffic includes internet protocol and multi-protocol labels(MPLS) traffic.

5. The router of claim 1 wherein said DRC driver includes a routing table including addresses of the packet flow processors.

6. A system for control and distribution of routing messages that supports communications over a system transport media among multiple components in a router, comprising:
   a Packet Flow Processor (PFP) driver including a plurality of PFP Application Program Interfaces (API) for interfacing to packet flow processors;
   a framework transport interface for interfacing between said PFP driver APIs and a system transport media, wherein the framework transport interface can be configured to support system transport media having a number of different transport protocols and media;
   a Dynamic Routing and Control (DRC) driver including a plurality of DRC Application Program Interfaces (API) for interfacing to a routing processor; and
   a transport interface for interfacing between said DRC driver APIs and the system transport media.

7. The system of claim 6, wherein one of the plurality of DRC APIs is a routing table API that allows the DRC driver to communicate routing table information to the PFP API in the PFP driver to update routing tables in the packet flow processors.

8. The system of claim 7, wherein one of the plurality of DRC APIs is an internet protocol API that allows the DRC driver to communicate IP messages through the PFP API in the PFP driver to and from packet flow processors that service IP network traffic.

9. The system of claim 8, wherein one of the plurality of DRC APIs is a control and network management API that allows the DRC driver to communicate configuration and performance monitoring messages through the PFP API in the PFP driver to and from packet flow processors.

* * * * *